Patented Nov. 17, 1936

2,061,338

UNITED STATES PATENT OFFICE 2,061,338

COATING PROCESS

Julian P. Ward, Cleveland, Ohio, assignor to The General Coating Company, Cleveland, Ohio, a corporation of Ohio No Drawing. Application April 29, 1935, Serial No. 18,878

15 Claims. (Cl. 91—68)

This invention relates to the coating of surfaces such as for example roofing material of sheet of shingle type or granules used in coating roofing material. It is especially useful in connection with surfaces which are colored by treatment with pigment bearing material but is not confined to colored surfaces.

The principal objects are to provide a permanent coating of superior quality and novel and advantageous features in the production of the same. A further object is to prevent deterioration of the coating and efflorescence by a suitable treatment of the material to be coated in advance of the coating proper. A further object is to prevent the formation of dust and loss of pigment and at the same time provide for the production of novel color effects. A still further object is to provide a two-layer coating, the inner of which is adapted to bear pigment material while the outer is adapted to protect the inner and to contribute to the formation of a bond between the coated surface and material to which the same may be attached, e. g., bituminous material.

Other and more limited objects will become apparent as the description proceeds. My invention is suitable for production of coatings generally but in the interest of simplicity it will be described with reference to two particular uses, namely, the coating of shingles, panels or the like and to the coating of granular material. In the preferred practice of my process both these materials can be treated with facility.

The main coating material which I employ is sodium silicate which is, as known in commerce, a dispersion in water and which may be viewed as a compound of somewhat varying composition of sodium and hydrated silicic acid. The variation is measured in practice and noted as the sodium oxide-silica ratio. I prefer to use a silicate of 8.9 Na$_2$O, 28.7 SiO$_2$ ratio. That sodium silicate is not a true solution is evident from its colligative properties. A thorough dispersion of sodium silicate in water, in the absence of soluble electrolytes, is a stable balanced system of particles of colloidal or ultra-microscopic size, and in this condition, a film of sodium silicate applied to a surface will give an evenly distributed layer of closely placed uniformly sized particles. If, however, the sodium silicate is treated with an electrolyte even in a small quantity, the colloidal condition is impaired, and an agglomeration of particles is produced at least in some parts and the result tends toward the formation of a gel. This impairment of the colloidal system is accompanied by a decrease in adhesiveness of the silicate to any surface to which it may be applied and by uniform distributions of various sized agglomerations of particles. Potassium silicate is also suitable and is to be considered the equivalent of sodium silicate.

In using sodium silicate as a vehicle for a pigment or as a coating in itself, I have found that superior results are produced when the coating is kept free from electrolytes until it has completely set into a permanent film. In order to secure this result it is necessary to avoid contamination of the film with soluble electrolytes. To this end the pigments which are employed must be rendered free of electrolytes and the material to which the film is applied must likewise be eliminated as a source of such contamination. I have found that by specifying that the pigment shall contain a maximum of one-tenth of one percent of water soluble matter, the contamination by electrolytes is sufficiently reduced for practical purposes. I have found that when my approved coating is applied to a panel or shingle composed of a mixture of asbestos and cement, freshly prepared, or is applied to granules of analogous material, a suitable treatment for rendering the surface free of electrolyte is to immerse the material to be coated in an aqueous solution of zinc sulphate containing about two pounds of the sulphate to a gallon of water. This treatment may consist of immersion in the solution for several minutes followed by drying for several hours, preferably over night. It is to be understood that any substance which will react with the alkali hydroxides or other electrolytes present in the surface to be coated, to produce an inert hydroxide or other compound, may be substituted for zinc sulphate. Where the surfaces to be coated are already neutral, it is, of course, clear that the above described treatment may be omitted.

The material to be coated, having been suitably conditioned, if necessary, is placed upon a traveling conveyor in such manner that the surface to be coated will be exposed and the sodium silicate solution containing suitable pigment, usually in the form of a metal oxide, is sprayed on. In the event a varied color effect is desired, in the case of granules or grained material, one color may be sprayed on vertically to the surface of the conveyor or at a small angle to the vertical and the portion of the same coating material carrying a different pigment may be sprayed on at a small angle to the horizontal whereby only one side of an elevation may be given the second color. The coating having been applied, the material, still on the conveyor and undisturbed, is passed into a stationary kiln having a temperature adjacent the point of entry of the material of about 180° F. The temperature within the kiln is regulated so that the material to be coated will attain a maximum temperature of about 420° F. If the cold granules are introduced into a kiln having a temperature of 400° F. or over, disruption of the film occurs, due to the rapid elimination of the moisture; the granules adhere to each other and the coating rubs off readily. As the material passes through the kiln a current of air is caused to flow reversely to the direction of progress of the material therethrough so as to carry off all volatile matter, principally moisture. It is desirable that the moisture content of the material shall be as little as practical before the same is admitted to the kiln so as to reduce the cost of driving off the volatile material. It is to be understood that the spraying and drying processes are equally applicable to panels or sheet material or granular material.

After the heating step has been completed and without more than a predetermined desirable amount of cooling, the coated material (sheet or granular) is passed into a vat containing a neutralizing substance adapted to neutralize the coating which on account of its composition will be alkaline. While acid such as hydrochloric and sulphuric can in some cases be used for this neutralizing step, they are not always suitable since some pigments are attacked and the film is either decolorized or changed in color or finish. It is essential to use ammonium chloride or equivalent rather than the acid for neutralization in any case where the pigment is affected by acid or where the base on which the color is applied contains iron and it is desired to preserve the true color without subsequent deterioration. In such cases and, if desired, in all cases, neutralization can be effected by the use of such a salt as ammonium chloride, that is, one which is capable of neutralizing alkalis. In general any salt of a weak base and strong acid is suitable. Treatment of the coated substances by immersion in ammonium chloride solution is best carried out at a temperature near the boiling point of water, that is, about 200° F. At this temperature neutralization can be effected in about seven minutes whereas at lower temperatures much longer time is required. It is desirable in some cases that the surface should be somewhat acid since a slight acidity tends to complete polymerization in e. g. China-wood oil, where $H_2SO_4$ is used, about 34 lbs. per ton of $\frac{3}{32}''$ granules will give a desirable acidity. It will be noted that the coated material may be allowed to cool from its maximum of 420° F. to such predetermined temperature as will result under the conditions of operation in maintaining the ammonium chloride solution at a predetermined desirable temperature of approximately 200° F. Treatment by a neutralizing agent neutralizes the total sodium oxide in the film forming a sodium compound which is eliminated by subsequent washing and only free neutralized silica is left adhering to the base. The strength of adhesion of this silica depends solely on the degree to which the original silicate had adhesion and this in turn depends on its complete dispersion which is maintained by a careful elimination of all soluble electrolytes in the production of the coating.

After neutralization is complete the coated material may be given an additional coat, preferably thin, of highly polymerized Aleurites or other polymerizable oil. This is particularly desirable in the case of granular material although not limited thereto and will be somewhat more fully described in connection therewith.

After the neutralization has been completed, the granules are agitated or gently tumbled with a solution of the polymerized oil in a suitable volatile vehicle which subsequently evaporates. In case the Aleurites oils are used, the ratio of oil to volatile vehicle will preferably be about 60 parts to 40 parts by weight in most cases. However, where the granules are porous a somewhat larger percentage of polymerized oil should be used in order to secure a sufficiently high gloss. Where the granules are not porous, the content of the volatile vehicle may be as high as 50%. I have found that by adjusting the percentage of the vehicle the gloss may be accurately controlled, the gloss being higher the lower the content of the volatile and the more porous granules requiring a lower volatile content to give the same degree of gloss. While I prefer to use the Aleurites oils (about 1¾ to 2 gallons of oil and volatile per ton for $\frac{3}{32}''$ granules), it is to be understood that other polymerized oils, such as linseed oil, certain fish oils, soya bean oil and the like may be used with more or less good results. The volatile may be naphtha or any other highly volatile vehicle with which the polymerized oil is readily miscible.

After the oil treatment is completed, the volatile material is allowed to evaporate and the granules are ready for application to a bituminous base of roofing material or for any other desired use. Granules of different colors may be mixed to give desired color effects. It is within the scope of my invention to coat any granular material with any pigment bearing coating and after the same has hardened to apply a coating of polymerized oil for securing the superior bonding and color characteristics and the other advantages described or to cover granules having any refractory coating with or without a pigment or granules having no coating, with polymerized oil for securing such advantages and to produce an article of manufacture consisting of a base material having such coated granules secured thereto by a suitable adhesive such as bituminous material.

Having thus described my invention, what I claim is:

1. A coating process comprising, applying to a lithic surface substantially free from soluble electrolytes, an alkali silicate dispersion substantially free from extraneous electrolytes, subjecting the resulting product to heat whereby to drive off moisture and harden the coating and then neutralizing the coating.

2. A coating process comprising, applying to a lithic surface substantially free from soluble electrolytes, an alkali silicate dispersion substantially free from extraneous electrolytes, subjecting the resulting product to heat whereby to drive off moisture and harden the coating and then neutralizing the coating and covering the same with a coating of polymerized oil.

3. A coating process comprising adding to an alkali silicate dispersion substantially free from extraneous electrolytes a quantity of substantially electrolyte free pigment material, and applying the same to a substantially electrolyte free lithic surface, and causing it to harden.

4. A coating process comprising adding to an alkali silicate dispersion substantially free from extraneous electrolytes a quantity of substantially electrolyte free pigment material, and applying the same to a substantially electrolyte free lithic surface, and causing it to harden and then covering said coating with a film of a polymerized oil.

5. A coating process comprising, applying to a lithic surface substantially free from soluble electrolytes, a sodium silicate dispersion substantially free from extraneous electrolytes, subjecting the resulting product to heat whereby to drive off moisture and harden the coating and then neutralizing the coating.

6. A coating process comprising, applying to a lithic surface substantially free from soluble electrolytes, a sodium silicate dispersion substantially free from extraneous electrolytes, subjecting the resulting product to heat whereby to drive off moisture and harden the coating and then neutralizing the coating by subjecting it to hot ammonium chloride solution.

7. A coating process comprising, applying to a lithic surface substantially free from soluble electrolytes a sodium silicate dispersion substantially free from extraneous electrolytes, passing the resulting product into a kiln and causing the temperature of said product to rise to a maximum of the order of 400° F. and then neutralizing the coating.

8. A coating process comprising, applying to a lithic surface substantially free from soluble electrolytes a sodium silicate dispersion substantially free from extraneous electrolytes, passing the resulting product into a kiln and causing the temperature of said product to rise to a maximum of the order of 400° F. and then neutralizing the coating by subjecting it to a hot ammonium chloride solution.

9. A coating process comprising treating a surface of an alkali containing, lithic body with a substance capable of reacting with an alkali constituent thereof to form at such surface an inert substance capable of preventing, permanently, the escape of free alkali from such body and applying to such surface a dispersion of alkali silicate substantially free from extraneous electrolytes, and causing the same to harden.

10. A coating process comprising treating a surface of an alkali containing, lithic body with a substance capable of reacting with an alkali constituent thereof to form an inert substance capable of preventing, permanently, the escape of free alkali from such body and applying to such surface a dispersion of alkali silicate substantially free from extraneous electrolytes, causing the same to harden, and neutralizing the resulting film.

11. A coating process comprising treating a surface of an alkali containing, lithic body with a substance capable of reacting with an alkali constituent thereof to form an inert substance capable of preventing, permanently, the escape of free alkali from such body and applying to such surface a dispersion of sodium silicate substantially free from extraneous electrolytes, causing the same to harden, and neutralizing the resulting film by treating it with hot ammonium chloride.

12. A coating process comprising applying to a lithic surface substantially free from soluble electrolytes a sodium silicate dispersion substantially free from extraneous electrolytes, passing the resulting product into a kiln having a temperature near the point of entrance of the order of 180° F., and causing the temperature of said product to rise to a maximum of the order of 400° F. and then neutralizing the coating.

13. A coating process comprising applying to a lithic surface, substantially free from electrolytes, an alkali silicate dispersion substantially free from extraneous electrolytes, passing the resulting product through a kiln whereby to dry and harden the same, and while such product is still hot passing it into a neutralizing bath.

14. The process which comprises coating absorptive, lithic granules with a pigment bearing silicate dispersion, causing said silicate to solidify, rendering the surface of said granules slightly acid and then applying to the granules a coating of polymerized Aleurites oil.

15. The process which comprises applying to absorptive, lithic granules a coating of a pigment bearing silicate dispersion, causing the said silicate to solidify thereon and then applying a coating of polymerized Aleurites oil in a volatile vehicle, the proportion of volatile vehicle to polymerized oil being greater or less accordingly as a low or high gloss respectively is desired.

JULIAN P. WARD.